(12) United States Patent
Schwesinger et al.

(10) Patent No.: US 8,272,015 B2
(45) Date of Patent: Sep. 18, 2012

(54) ALTERNATE SOURCE CONFLICT RESOLUTION

(75) Inventors: Mark Schwesinger, Bellevue, WA (US); Josh Gustafson, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 11/933,843

(22) Filed: Nov. 1, 2007

(65) Prior Publication Data
US 2009/0119715 A1 May 7, 2009

(51) Int. Cl.
*G06F 3/00* (2006.01)
*G06F 13/00* (2006.01)
*H04N 5/445* (2006.01)

(52) U.S. Cl. ............... 725/58; 725/46; 725/49; 725/142; 386/292

(58) Field of Classification Search .................. None
See application file for complete search history.

(56) References Cited

U.S. PATENT DOCUMENTS

| | | | |
|---|---|---|---|
| 5,801,787 A * | 9/1998 | Schein et al. ................ 725/43 |
| 6,601,237 B1 * | 7/2003 | Ten Kate et al. ............. 725/47 |
| 6,701,528 B1 * | 3/2004 | Arsenault et al. ............ 725/89 |
| 6,804,824 B1 | 10/2004 | Potrebic et al. |
| 6,859,845 B2 | 2/2005 | Mate |
| 2001/0033343 A1 | 10/2001 | Yap et al. |
| 2003/0204848 A1 * | 10/2003 | Cheng et al. ................ 725/58 |
| 2004/0003405 A1 * | 1/2004 | Boston et al. ............... 725/58 |
| 2004/0013409 A1 | 1/2004 | Beach et al. |
| 2004/0156614 A1 | 8/2004 | Bumgardner et al. |
| 2004/0221308 A1 * | 11/2004 | Cuttner et al. .............. 725/46 |
| 2005/0005300 A1 * | 1/2005 | Putterman et al. ........... 725/89 |
| 2005/0071869 A1 * | 3/2005 | Fairhurst .................... 725/46 |
| 2005/0155058 A1 * | 7/2005 | Jung et al. .................. 725/38 |
| 2005/0204388 A1 * | 9/2005 | Knudson et al. ............ 725/58 |
| 2005/0251826 A1 | 11/2005 | Orr |
| 2006/0037047 A1 * | 2/2006 | DeYonker et al. ........... 725/58 |
| 2006/0037048 A1 | 2/2006 | DeYonker et al. |
| 2006/0111881 A1 * | 5/2006 | Jackson ....................... 703/2 |
| 2006/0140584 A1 | 6/2006 | Ellis et al. |
| 2006/0268099 A1 | 11/2006 | Potrebic et al. |
| 2007/0079334 A1 | 4/2007 | Silver |
| 2008/0115166 A1 * | 5/2008 | Bhogal et al. .............. 725/46 |

FOREIGN PATENT DOCUMENTS
EP 1187467 A2 3/2002

OTHER PUBLICATIONS

Windows XP Media Center Edition 2005: Frequently asked questions, printed on Jan. 19, 2006. http://www.wardconciliation.com/MediaCenterFAQ.PDF.

Media Made Easy May 2005 Newsletter, printed on May 2005. http://www.mediamadeeasy.net/files/Media_Made_Easy_may05_Newsletter.pdf.

TiVo versus MCE versus my cable company, Mar. 3, 2005. http://www.edbott.com/weblogiarchives/000509.html.

* cited by examiner

*Primary Examiner* — Dominic D Saltarelli
*Assistant Examiner* — Jason J Chung
(74) *Attorney, Agent, or Firm* — Vierra Magen Marcus & DeNiro LLP

(57) ABSTRACT

A system and methods for acquiring scheduled television programs with coinciding program times. One method includes initially identifying that a conflict exists to acquire the scheduled television programs. Once the conflict is identified, the method identifies one or more alternate sources that contain the scheduled television programs. Acquisition schedules are generated and optimized. Then, at least one of the scheduled television programs are recorded from one of the alternate sources. A user may set user preferences to customize how the system will generate potential acquisition schedules.

16 Claims, 8 Drawing Sheets

ALTERNATE SOURCE CONFLICT RESOLUTION

BACKGROUND

It is now common for television programs to be recorded on hard disks in digital recorders associated with televisions. These digital recorders are often referred to as a personal video recorder (PVR) or a digital video recorder (DVR). Traditional PVRs and DVRs have a fixed number of tuners which can be used to record content from a broadcast source, which limits the number of shows that can be simultaneously recorded at any given time. If the user requests that too many shows be recorded at once, the only recourse is to prompt the user to ask which subset of those shows are most important to record and to fail to record the rest.

Another recent development is the electronic program guide (EPG), which graphically displays television program's listings on television screens. Although there are various EPGs being used today, EPGs typically display programs in a grid format for multiple channels and various time slots. Accordingly, the viewer scrolls along both horizontal and vertical axis to identify television programs being broadcast at different times and on different channels. The EPG allows a viewer to easily learn what program is being broadcast on a specific channel during a specific time.

While EPGs can assist the viewer in identifying when programs are being broadcast, they have also been used to streamline the process of programming recording systems. For instance, depending upon the user interface associated with the PVR that includes the EPG, a viewer can use specific features on the user interface (UI) of the PVR to program a recording. For example, the viewer may simply select a box or region corresponding to a program within the EPG in order to schedule the program for recording. Alternatively, the viewer may be required to go to a different user interface page or display to cause the recording system to be programmed appropriately.

Programs (also referred to as "broadcast content") are now available through alternate sources. For example, episodes of television programs are now commonly available as a digital download or streaming media. The same is true for movies. Yet PVRs and DVRs cannot resolve a recording conflict by obtaining the broadcast content with identical or overlapping broadcast times by obtaining the broadcast content from an alternate source.

SUMMARY

One aspect of the present technology is to provide a method for acquiring scheduled television programs with overlapping program times. Once it is determined that a conflict exists for acquiring the scheduled television programs, a digital recorder, by way of example only, identifies one or more alternate sources that contain the conflicting scheduled television programs. The alternate sources are then arranged into an acquisition plan (or acquisition schedule). Based on user preferences, either expressly set or implied by the digital recorder, at least one of the scheduled television programs is then obtained from one of the alternate sources.

Another aspect of the present technology is to provide a user interface that allows a user the option to select one recording plan from among several possible ones. In one embodiment, the present technology provides a user interface that allows the user to select the acquisition plan recommended by the system. In another embodiment, the user can modify the acquisition schedule of a digital recorder by altering individual conflicting programs. In yet another embodiment, the present technology presents the user with multiple acquisition schedules, and the user selects one.

Another aspect of the present technology is a method for selecting an ideal acquisition schedule from among possible acquisition schedules, based on previous user input. Once a recording conflict has been identified, an alternate source is identified for each scheduled program that is involved in the conflict. Potential acquisition schedules are generated and evaluated according to various criteria. If the user has set any recording preferences, the digital recorder will attempt to generate an acquisition schedule that satisfies all the user preferences. If the system cannot create such an acquisition schedule, the system will rank all sub-ideal schedules and prompt the user to select one. If the user is not present, in one embodiment, the system will choose the highest ranked sub-ideal schedule and the digital recorder will execute on that schedule.

DETAILED DESCRIPTION

The technology described herein is a mechanism allowing acquisition of broadcast content scheduled at the same or overlapping broadcast time. One example of the technology is a digital recorder. The digital recorder obtains broadcast content from alternate sources when more than one program is scheduled to be recorded and the digital recorder cannot record all the programs at the scheduled broadcast time. Another example is software for identifying the alternate sources containing the programs and assembling acquisition schedules for acquiring each of the broadcast content.

For purposes of describing the technology only, many of the aspects of the present technology will be described in context of a digital recorder that may acquire television programs from sources other than a broadcast tuner. By way of example only, such acquisition could consist of persisting a link to a streaming video source, downloading the content from an Internet site, copying the content from another PVR, or scheduling the recording on the tuner of another PVR. By considering these alternate sources of content, alternate source conflict resolution allows the digital recorder to reduce the frequency with which the user must be prompted to resolve conflicts, and to successfully acquire a larger percentage of the shows requested by the user.

Figures 1A, 1B:
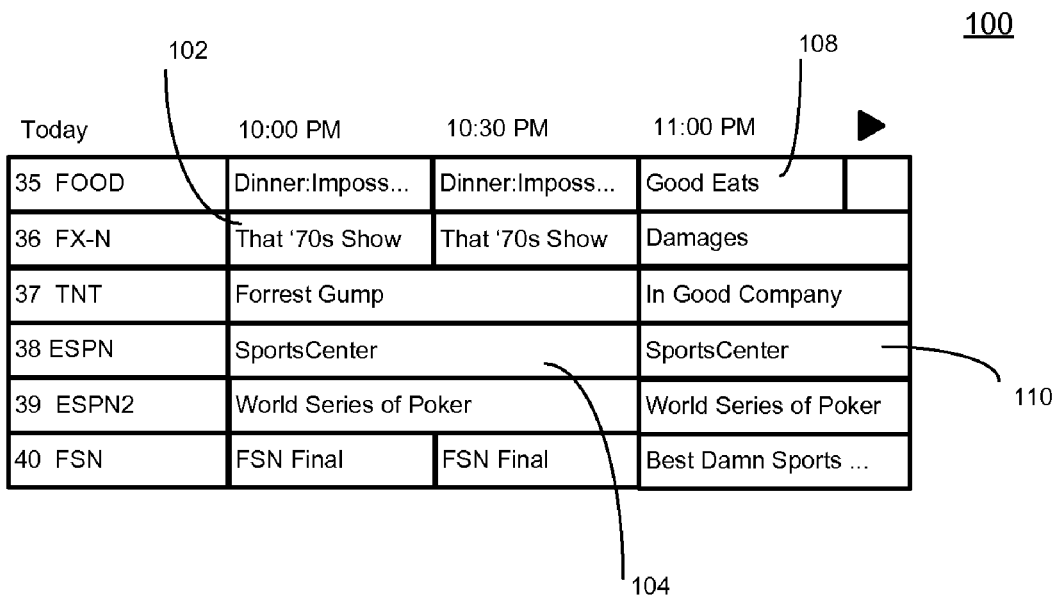
FIG. 1A-1B depict an exemplary electronic program guide that can be used to select various programs.

FIGS. 1A-1B illustrates an electronic program guide (EPG) 100 for selecting scheduled programs. EPG 100 may be used for making recording requests for scheduled programs among a plurality of scheduled entries or programs. Suppose a viewer uses the EPG 100 to select the following four programs for making recording requests on a digital recorder that contains only one tuner: "That '70s Show"® 102, "SportsCenter"® 104, "Last Comic Standing"® 106 and "Good Eats"® 108. "That '70s Show" 102 is scheduled to be broadcast between 10:00 pm and 10:30 pm on Channel 36. "SportsCenter" 104 is scheduled to be broadcast between 10:00 pm and 11:00 pm on Channel 38. "Last Comic Standing" 106 is scheduled to be broadcast between 10:00 pm and 11:00 pm on Channel 703. "Good Eats" 108 is scheduled to be broadcast between 11:00 pm and 11:30 pm on channel 35.

Because the digital recorder contains a single tuner, three conflicts exist. The first conflict exists between the recording request for "That '70s Show" 102 and "SportsCenter" 104. "That '70s Show" 102 and "SportsCenter" 104 both start at 10 pm and "That '70s Show" overlaps with "SportsCenter" between 10:00 pm and 10:30 pm. The second conflict exists between "That '70s Show" 102 and "Last Comic Standing" 106. Both "That '70s Show" and "Last Comic Standing" start at 10 pm, and "That '70s Show" overlaps with "Last Comic Standing" between 10:00 pm and 10:30 pm. The third conflict exists between "SportsCenter" 104 and "Last Comic Standing" 106 because both shows are scheduled to be broadcast between 10:00 pm and 11:00 pm on different broadcast channels. It should be noted that although this example, and other examples of the present technology, reference a digital recorder with a particular number of tuners, the present technology is not limited to any given number of tuners. Accordingly, the use of the number of tuners in this and the following examples are used for illustrated purposes only and are not meant to limit or otherwise limit the scope of the present technology.

Figure 2:
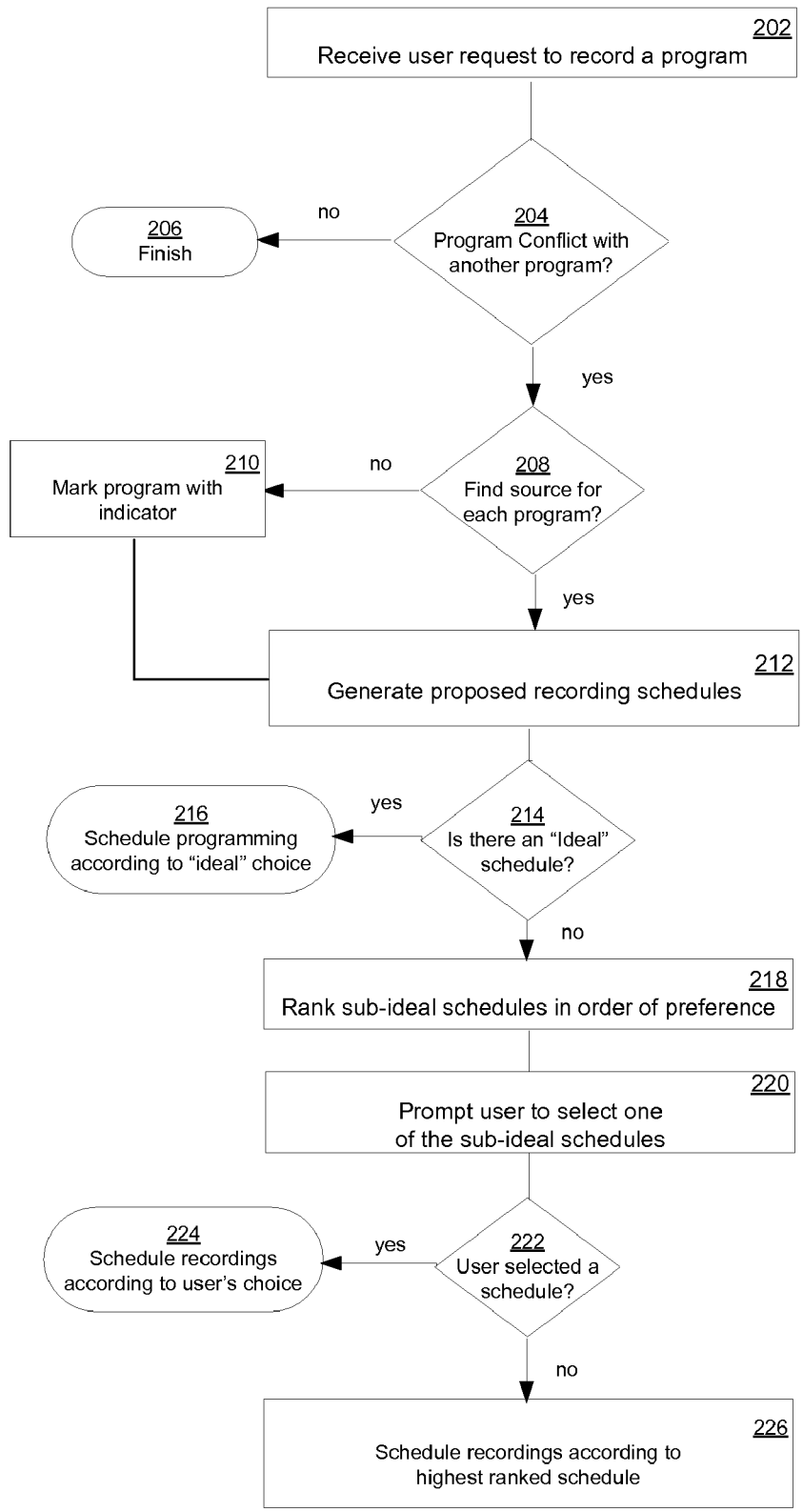
FIG. 2 depicts an flow diagram displaying exemplary steps for resolving a recording conflict.

FIG. 2 illustrates exemplary steps for resolving a conflict in recording multiple programs with coinciding or overlapping scheduled broadcast times. In step 202, a request from the user to record a program is received. In the above example, suppose the user's last recording request is to record the television show "Last Comic Standing," which airs at 10:00 PM for one hour.

Upon receipt of the recording request for "Last Comic Standing", the method 200, in step 204, determines whether the request to record "Last Comic Standing" 106 will conflict with any other previously scheduled recordings (e.g., "That '70s Show" 102 and "SportCenter" 104). The method 200 may determine if a conflict exists in any manner. In one embodiment, the method 200 determines if a previously scheduled program (e.g., "SportsCenter" 104) is already scheduled to be recorded by the digital recorder at the same time. In another embodiment, the method 200 determines a conflict exists if any scheduled programs have a broadcast time that overlaps with another scheduled program. In the example above, if the request to record "Last Comic Standing" 106 does not conflict (or overlap) with any other previously scheduled recordings, all of the scheduled programs will be recorded during their original broadcast time, in step 206.

If there is a conflict in recording requests, the method 200, in step 208, identifies alternate sources for acquiring at least one of the programs with a conflicting schedule. In one embodiment, the method 200 searches for an alternate source for each and every scheduled program with a conflict. In another embodiment, the method 200 searches for an alternate source for only each one of the conflicting programs. In another embodiment, the method 200 searches for an alternate source for all but one of the conflicting programs. By way of example only, the alternate sources the method 200 searches for a given broadcast channel at a given time, a digital download of the program from a third party source (e.g., website), saving a link to a stream of the program, or delegating the request to another digital recorder (e.g., another PVR or DVR). The method 200 also identifies repeat broadcasts of the program.

In the above example where there is a conflict in recording "Last Comic Standing" and "SportsCenter", the method 200 will search for at least one alternate source that contains "Last Comic Standing" and at least one alternate source that contains "SportsCenter" in step 208. By way of example only, the method 200 may have identified a link to a stream of "SportsCenter" 104 and a repeat television broadcast of "SportsCenter" 104 (e.g., "SportsCenter" 110 in FIG. 1A). The method 200 may have also identified a repeat broadcast of "Last Comic Standing" 106.

In Step 208, the method 200 determines if an alternate source has been located for each program that may require rescheduling. For any program that the method 200 cannot find an alternate source, the program, in the UI, is marked with an indictor in step 210. For example, if an alternate source was not found for recording "That '70s Show", the UI 400 includes an indicator 414 for "That '70s Show" (e.g., exclamation point graphic) to alert the user that another source is not available to record "That '70s Show". Such an alert will draw the user's attention to the fact that not all of the user's requests will be satisfied.

In step 212, the method 200 generates proposed acquisition schedules. Each proposed acquisition schedule includes an acquisition method for each scheduled program. In one embodiment, the method 200 first considers the consequences of choosing each alternate source identified for each program. While examining possible alternate sources, the method 200 uses a heuristic to determine the desirability of a specific alternate source. The heuristic is based in part on recording preferences set by the user (if any).

For example, the user may have prioritized that recording "Last Comic Standing" at its regularly scheduled broadcast time is more important than recording "SportsCenter" at its regularly scheduled broadcast time. Or the user, through UI 500 (see FIG. 10), may have designated that the preferred acquisition method is broadcast television. Thus, the method 200 will generate an acquisition schedule containing the choices for acquiring the broadcast of "Last Comic Standing" at 10 pm and prioritize the alternate sources identified for acquiring "SportsCenter". Further, if the user, through UI 310, selected HD broadcast, the acquisition schedule would include an HD download of "SportsCenter." The next optimum choice would be to download an HD version of "SportsCenter" at no cost (see FIG. 10 settings).

Figure 5:
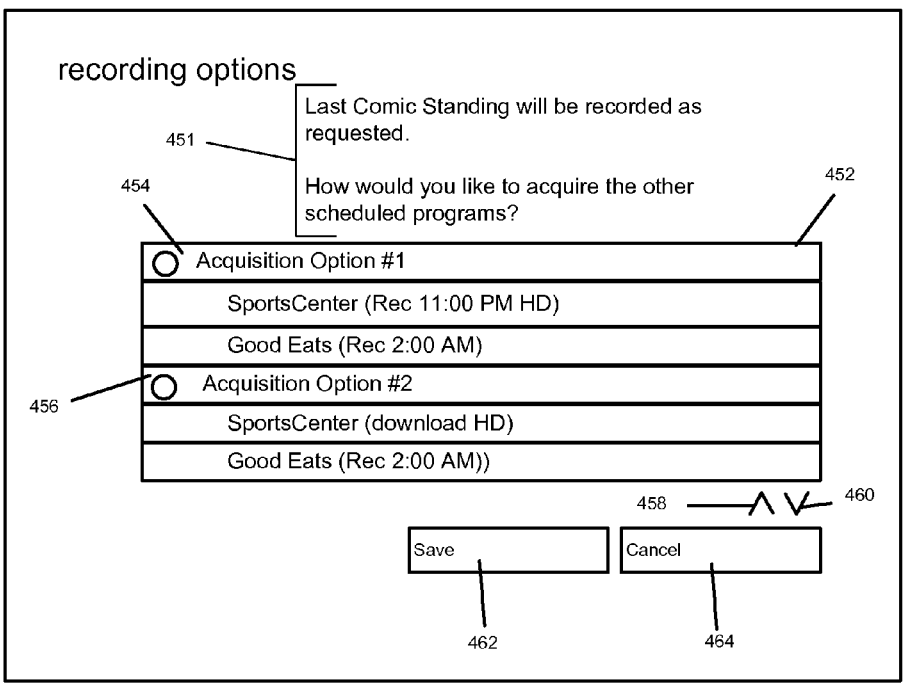
FIG. 5 depicts an exemplary user interface that is displayed when a user chooses one of the recording options in the user interface shown in FIG. 4.

Based on the available choices of alternate sources, the method 200 generates the proposed acquisition schedules. FIG. 5 illustrates an example of a UI 400 displaying proposed acquisition schedules. The UI 400 displays Acquisition Schedule #1 454, which proposes recording "SportsCenter" at 11:00 pm and "Good Eats" at 2:00 am. Preferably, more than one acquisition schedule is created to provide the user with multiple schedules. Thus, the UI 400 also displays Acquisition Schedule #2, which proposes downloading "SportsCenter" and recording "Good Eats" at 2:00 am. Other acquisition schedules may be generated.

The method 200, in step 214, determines if one of the proposed acquisition schedules is an "ideal" schedule. An "ideal" schedule is a proposed acquisition schedule that meets all of the user preferences (if any are set). An "ideal" schedule is not required to meet all of the user preferences (e.g., all preferences except for one). For example, in the UI 300, the user has selected that the preferred Source 310 for broadcast content is Broadcasted television 330, the preferred Quality 316 for a program is high definition 326 and the preferred Cost 314 for a program is free 320. Thus, the "ideal" schedule would be a proposed acquisition schedule containing an HD version of a free broadcasted program—for each program scheduled to be acquired. It is not possible to obtain a free, HD version of every broadcast program when there are multiple programs scheduled to be acquired at the same time (or overlap in time). Thus, the method 200 will acquire an HD broadcast of the higher ranked program (e.g., "Last Comic Standing") and determine the best acquisition schedules for obtaining the other conflicting programs.

If the user has not set any recording preferences in the digital recorder, the method 200 will attempt to infer what an "ideal" acquisition schedule would be based on the user's prior actions. For example, if the user has previously acquired "Last Comic Standing" from a high definition broadcast channel, the system will infer that the user prefers high definition versions of a show over a standard definition version of the show. Similarly, the method 200 will infer that the user prefers to acquire programs from a television broadcast (e.g., as opposed to downloading the program). Or, if a user previously acquired a show from HBO, the system may infer that the user prefers to acquire shows from HBO rather than other non-premium channels.

If it is a determined in step 214 that a particular acquisition schedule is "ideal," then the method 200 selects the "ideal" schedule and sets the acquisition schedule of the digital recorder to the "ideal" schedule (step 216). In one embodiment, the method 200 may prompt the user to confirm that the selected "ideal" acquisition schedule is acceptable to the user. In another embodiment, there is no need to consider further schedules or to prompt the user because the "ideal" acquisition schedule meets the user's preferences. Thus, the acquisition schedule of digital recorder is automatically set to the "ideal" acquisition schedule.

If the method 200 determined that there is not an "ideal" schedule, then the method 200 ranks the possible sub-ideal acquisition schedules in order of preference in step 218. Ranking the sub-ideal acquisition schedules is based on user preferences, known or inferred. Some of the user preferences have previously been described and are illustrated in FIGS. 3 and 8-10. Thus, the highest ranked sub-ideal acquisition schedule is the acquisition schedule that best meets the user preferences. The next highest ranked sub-ideal acquisition schedule is the next-best match to the user preferences. Each of the sub-ideal acquisition schedules will be ranked from highest to lowest.

In step 220, the sub-ideal acquisition schedules are displayed in a UI and the user is prompted to choose on of the sub-ideal acquisition schedules. The UI 450 in FIG. 5 illustrates one embodiment of prompting a user to choose a sub-ideal acquisition schedule. In this embodiment, the UI 450 presents Acquisition Schedule #1 454 and Acquisition Schedule #2 456 to the user. Acquisition Schedule #1 meets most of the user preferences (out of all the sub-ideal acquisition schedules) and is therefore, listed first in the interface 452. Listing the highest ranked acquisition schedule first makes it easier for the user to select a schedule that meets as many user preferences as possible. Displaying this listing order also prevents the user form having to scroll through the acquisition schedules to find an acceptable schedule.

Figure 6:
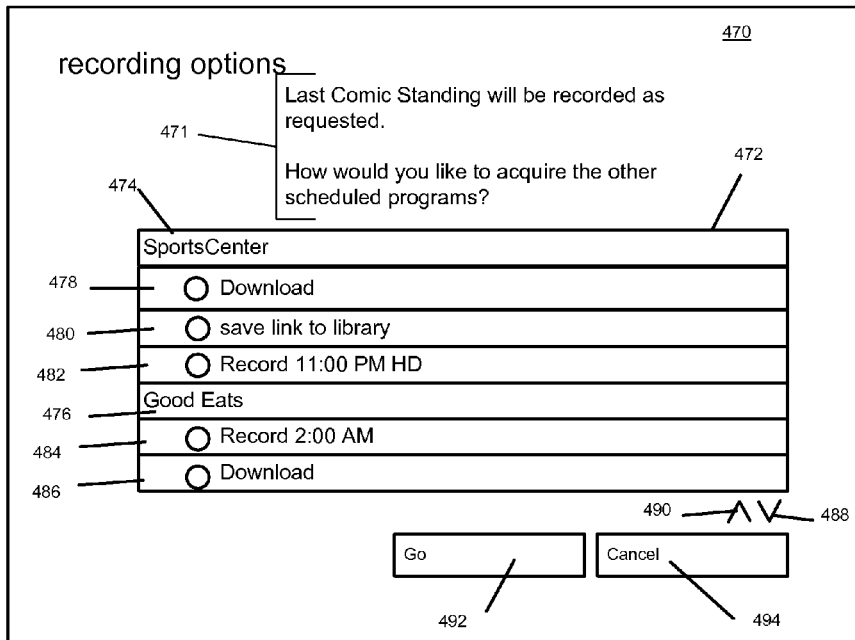
FIG. 6 depicts an exemplary user interface that is displayed when a user chooses a recording option in the user interface shown in FIG. 4.

In another embodiment, the possible choices for acquiring each program are listed and the user may select the choices. FIG. 6 provides one such example. In FIG. 6, the UI 470 displays three choices to the user to acquire "SportsCenter" 474: download 478, save a link 480 or acquire an HD version of the show at 11:00 PM 482. Preferably, the first choice provided to the user, download 478, is the user's first choice. This feature is not required. The UI 470 presents two choices to the user to record Good Eats 476: record the show at 2:00 AM 484 or download the show 486. Again, it is preferable to display first the schedule the user is most likely to select, record the show at 2:00 AM 484. Once the user selects an acquisition schedule for each show, the user may click the "go" button 492 and the system will set the acquisition schedule of the digital recorder to the selected acquisition schedule.

Figure 4:
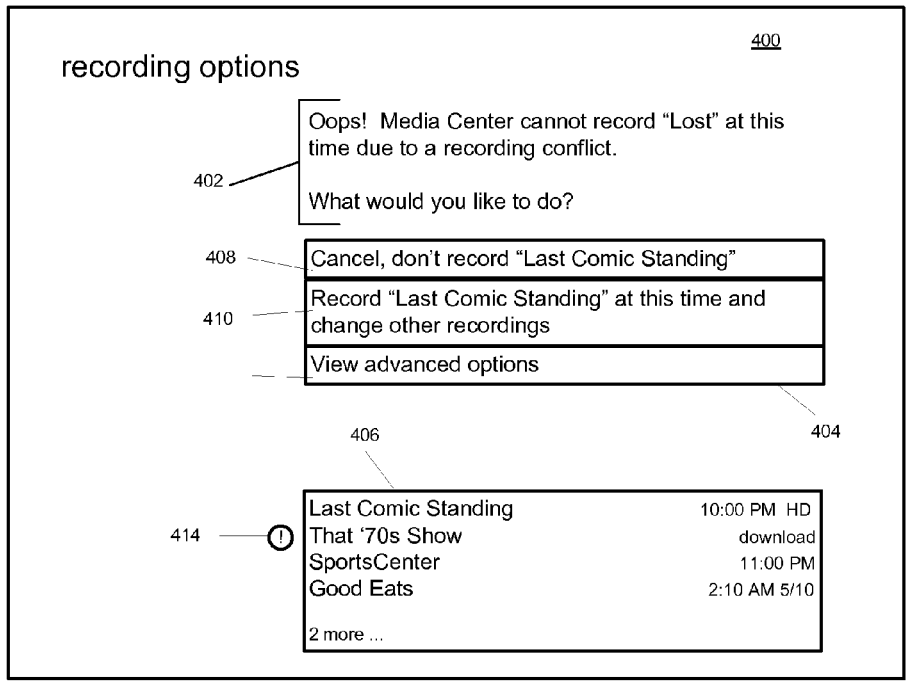
FIG. 4 depicts an exemplary conflict resolution user interface.

In another embodiment, only the highest ranked sub-ideal acquisition schedule is initially presented to the user. The UI 400 shown in FIG. 4 is one such example. The UI 400 informs the user that a recording conflict has been detected. The interface 404 in the UI 400 offers three choices to the user: cancel the request to record Lost 408, record Lost at the scheduled time and change other conflicting recordings 410 or view advanced options 412. The UI 400 also displays the highest ranked sub-ideal schedule in the display 406. If the user selects the Record "Last Comic Standing" button 410, the system will record the other programs as shown in display 406.

If the user selects one of the sub-ideal acquisition schedules in step 222, the method 200 will set the acquisition schedule of the digital recorder according to the user's selection. If the user does not select one of the sub-ideal acquisition schedules in step 222, the method 200 will set the acquisition schedule of the digital recorder to the highest ranked sub-ideal acquisition schedule.

The method 200 also works well for situations when a programming conflict occurs but the user is not present to make a decision. In such cases, the method 200 defaults to the highest ranked sub-ideal acquisition schedule and sets the acquisition schedule of the digital recorder accordingly. The end result is a much improved user experience—more of the user's content requests are fulfilled, the user is prompted less often and only in situations where their previously stated priorities aren't enough information to make an automatic decision. In cases when the user is prompted, the UI is optimized to make it easy to select the schedules the user is likely to want. Finally, when the user is not present to make a decision, the method 200 makes a "best guess" of what the user would want, and can use that guess to proceed.

Figure 3:
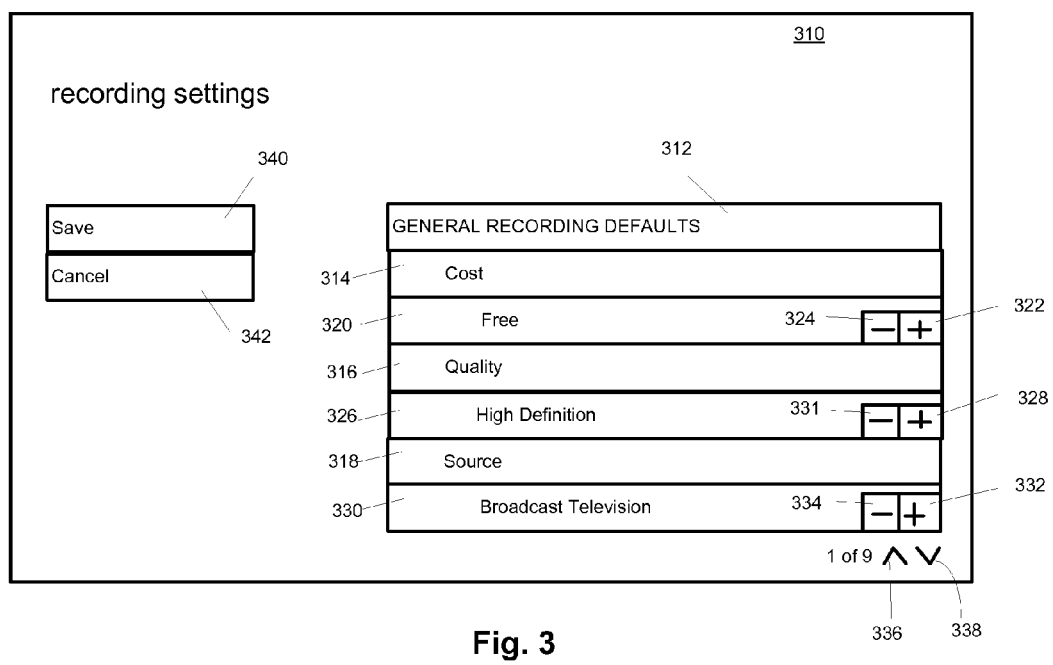
FIG. 3 depicts an exemplary user interface for setting recording defaults.

FIG. 3 illustrates an exemplary UI that allows a user to set general recording defaults. The UI 310 includes a default setting guide 312. The guide 312 displaying the recording settings or preferences that the user may expressly set. These general settings each allow the user to specify one characteristic for programs obtained by the digital recorder when searching for alternate sources and generating potential acquisition schedules (see method 700).

The guide 312 shown in FIG. 3 displays the first three recording settings or attributes a user can specify: a Cost attribute 314, a Quality attribute 316 and a Source attribute 318. The user sets the value 320 associated with the Cost 314 by selecting or clicking on the plus key 322 or the minus key 324. In FIG. 3, the value 320 is set to "Free." By selecting either the plus key 322 or the minus key 324, the user may scroll through the possible cost values 320. Other cost values 320, by way of example only, may include "pay-per-view," "purchase," "subscription," or "no preference". When the value 320 set to "Free," the digital recorder will rank a free version of the program higher than a pay-per-view version of the same program. Another possible UI would allow the user to explicitly rank individual values, and specify options such as "Prefer subscription, then free, then purchase, then pay-per-view."

The user may also select to value 326 associated with the Quality 316 by selecting or clicking on the plus key 328 or the minus key 330. In FIG. 3, the value 321 is set as "High Definition." By way of example only, the Quality 326 may also be set to Standard Definition, or "no preference". When the value 321 is set to "High Definition," the digital recorder will rank a high definition version of the program higher than a Standard Definition of the same program.

The user may also select the value 330 associated with the Source 310 by selecting or clicking on the plus key 332 or the minus key 334. In FIG. 3, the value 330 is set to "Broadcast Television." By way of example only, the Source 330 may also be set to a specific on-line provider, "Third Party Website," "link to Stream," "Copy from another PVR," "Schedule on another PVR," or "no preference". When the value 330 is set to "Broadcast Television," the digital recorder will rank a television broadcast of a program higher than a downloadable version of the program, for example.

Another aspect of user preference specification is the relative order of importance of the various preferences. For example, if a user has specified a preference for free content, and a preference for HD content, and the only possible acquisition options are free SD or purchase HD, then a method is needed to determine which preference it is more important to satisfy. One method defines an ordering of the preferences, and states that it is more important to satisfy a given preference than it is to satisfy any or all of the preferences lower in the ordering. This ordering can be user-specified, or it can be fixed at design-time. (By way of example, it might be decided at design-time that it is always more important to meet a cost preference than a quality preference.) Another method defines a weight for each preference, and states that, given two sets of preferences, it is more important to satisfy the set of preferences whose summed weight is greater. The weights for each preference may be specified by the user, or they may be fixed at design-time.

In a one embodiment, each of the values in the guide 312 is set to "no preference" as a default setting. This way, the digital recorder will treat all versions of the program equally. When the user has selected and/or modified the values, the user may save the changes made to the setting guide 312 by clicking on the save button 340. On the other hand, the user may click on the Cancel button 342 if the user wants to exit the setting guide without saving any changes to the setting guide 312.

FIG. 4 illustrates an embodiment of a conflict resolution UI. The UI 400 includes a message 402, an option interface 404 and a conflict resolution interface 406. The message 402 displayed in FIG. 4 is exemplary, and may comprise any text. The message prompts the user to make a recording selection to resolve the conflict. In this embodiment, the option interface 404 includes three recording selections: a cancel button 408, a record button 410 and an advanced options button 412. The conflict resolution interface 406 displays the "one," or highest ranked acquisition schedule (discussed in more detail later), determined by the scheduler. This "one" acquisition schedule shown in the interface 406 will be followed if the user selects the record button 410. In FIG. 4, the interface 406 displays that a high definition (HD) version of "Last Comic Standing" 106 will be recorded at 10:00 PM, "That '70s Show" 102 will be downloaded, a repeat broadcast of "SportsCenter" will be recorded and a repeat broadcast of Good Eats 108 will be recorded at 2:00 AM the following day.

FIG. 5 illustrates another embodiment of a UI that may be displayed to to the user. In one embodiment, the UI 450 is displayed to the user if the user selects the record button 410 (see FIG. 4). In another embodiment, the UI 450 is displayed to the user as a first opportunity to modify the recording schedule entered by the user. The UI 450 includes an interface 452 that provides alternate recording schedules. The interface 452 displays two recording schedules: Recording Schedule #1 454 and Recording Schedule #2 456. Because the user previously selected the record button 410, which requests recording "Last Comic Standing" at a specific time, "Last Comic Standing" will be recorded no matter which schedule the user chooses in the interface 452. Thus, in one embodiment, Recording Schedule #1 454 and Recording Schedule #2 456 do not include a description for "Lost."

Recording Schedule #1 454 suggests recording an HD version of a repeat broadcast of "SportsCenter" at 11:00 PM and recording a repeat broadcast of Good Eats at 2:00 AM. Neither of the suggested times for these programs conflict with the 10:00 PM showing of "Last Comic Standing". Recording Schedule #2 456 suggests recording a repeat broadcast of Good Eats at 2:00 AM and downloading an HD version of a repeat broadcast of "SportsCenter". Again, neither of these recording schedules conflict with the 10:00 PM showing of "Last Comic Standing". If the user does not like either Recording Schedule #1 454 or Recording Schedule #2 456, the user may scroll through additional recording schedules by clicking the up indicator 458 or the down indicator 460. The user may save a selection by clicking the save button 462 or return to the previous page by clicking the cancel button 464.

FIG. 6 illustrates an embodiment of a UI that may be displayed to the user if the user selects the advance options button 412 (see FIG. 4). Here, the UI 470 provides the user with the most flexibility to schedule recordings for shows that conflict with recording "Last Comic Standing". The UI 470 includes a recording interface 472. The interface 472 lists each show that conflicts with the schedule recording time for "Last Comic Standing". The UI 472 displays "SportsCenter" 474 and Good Eats 476. Beneath each program are recording options.

For example, the interface 472 displays three options to record "SportsCenter": download the show 478, save a link to the show 480 or record an HD version of the show at 11:00 PM 482. The user may select any of these three options 478-482. For Good Eats, the interface 472 presents the user with two choices: record a repeat broadcast of the show at 2:00 AM 484 or download the show 486. The interface 472, in this embodiment, only displays two shows at one time. The user may view additional recording options by selecting the down arrow 488 or the up arrow 490. In one embodiment, every recording option for each show is displayed. In other embodiments, only a few of the recording options are displayed for each show (e.g., top three options). The user may save the recording choices by selecting the save button 492 or exit the UI by selecting the cancel button 494.

Figure 7:
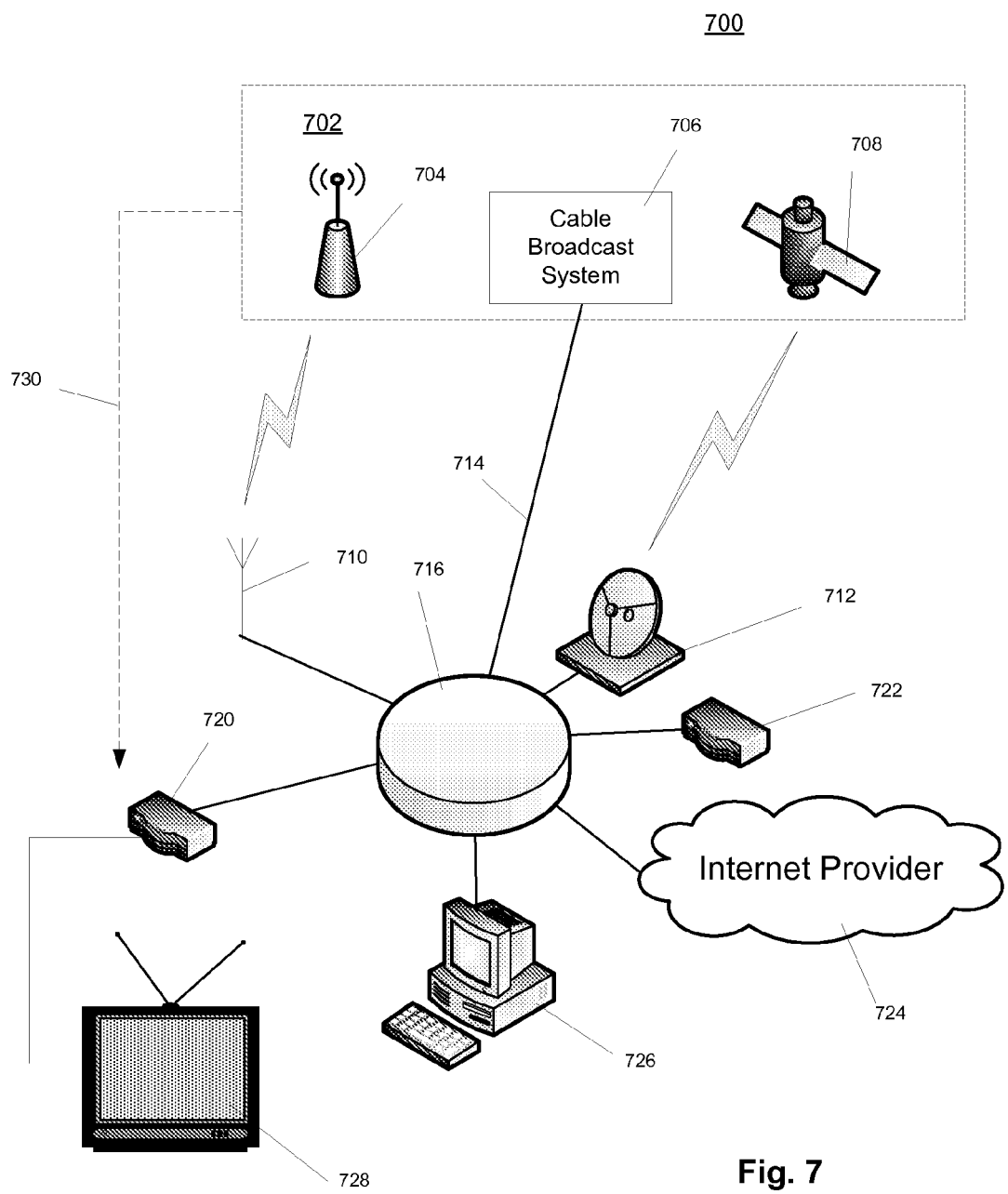
FIG. 7 depicts a schematic diagram of an embodiment of a television system.

FIG. 7 illustrates an embodiment of a television system 700. The system 700 includes a broadcast system 702 and a receiver system 703. The broadcast system includes a television antenna 704, a cable broadcast system 706 and a satellite broadcast system 708. The receiver system 703 includes an antenna 710, a satellite dish 712, a first digital recorder 720, a second digital recorder 722, a computer 726 and a television 728. In the FIG. 7 embodiment, each of these components is connected to a network 716. The television 728 is connected to the first digital recorder 720 and is not connected directly to the network 716, as shown in FIG. 7. Of course, the television 728 may be connected directly to the network 716. The coaxial cable 714 is shown in FIG. 7 as connected directly to the network 716. The cable 714 may also be connected to other components. By way of example only, the cable 714 may also be connected directly to the computer 726, the first digital recorder 720, the second digital recorder 722 or the television 728.

The system 700 also includes an Internet provider 724 so that the system 700 may acquire content from sources other than from the broadcast system 702. For example, as discussed above, the system 700 may acquire a digital download of a television program. The Internet provider 724 may communicate with the network 716 (or any other component) either wirelessly, a network or any other technology known in the computer communication art. In one embodiment, the Internet may also be accessed through the coaxial cable 714 as well as the Internet provider 724. The FIG. 7 embodiment illustrates that the first digital recorder 720 may receive a broadcast signal either from the network 716 or through a wireless connection 730. Of course, the entire network 716 may comprise a wireless network.

The present technology described herein may reside in the any of the components displayed in FIG. 7. For example, software executing the methods described herein may reside in the computer 726. In another embodiment, the software may reside in the first digital recorder 720. In another embodiment, the software may reside in the second digital recorder 722. In yet another embodiment, the software may reside in a set-top box (not shown).

Figure 8:
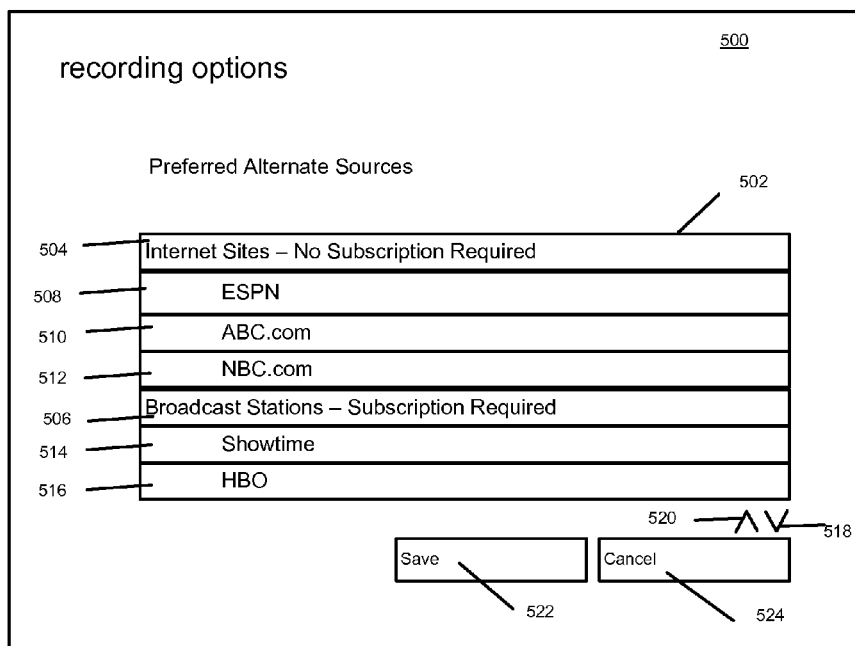
FIG. 8 depicts an exemplary user interface for designating user preferences.
Figure 9:
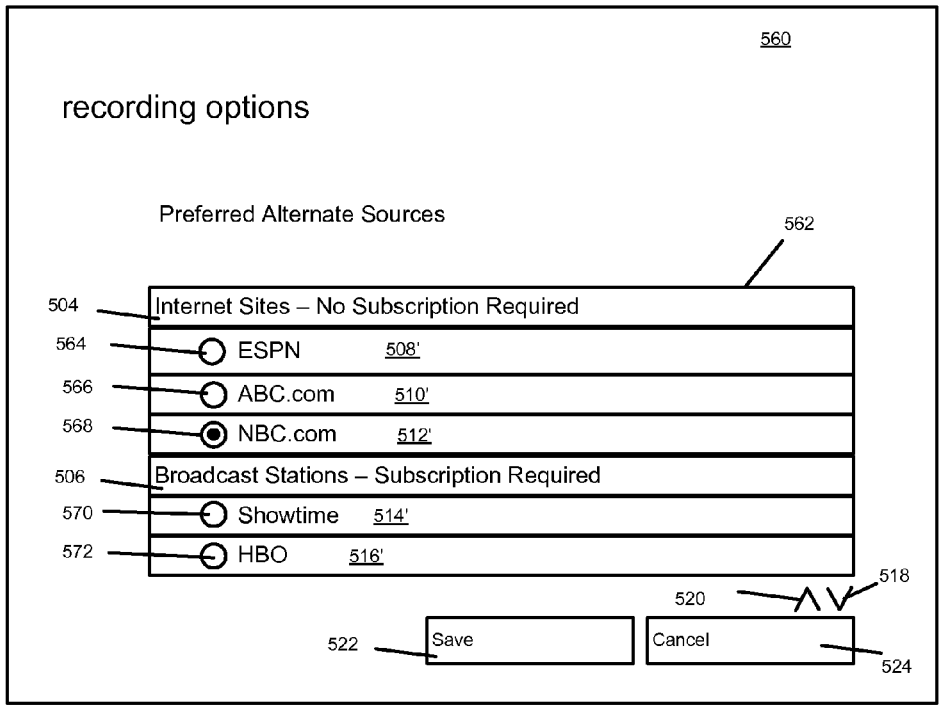
FIG. 9 depicts another exemplary user interface for designating user preferences.
Figure 10:
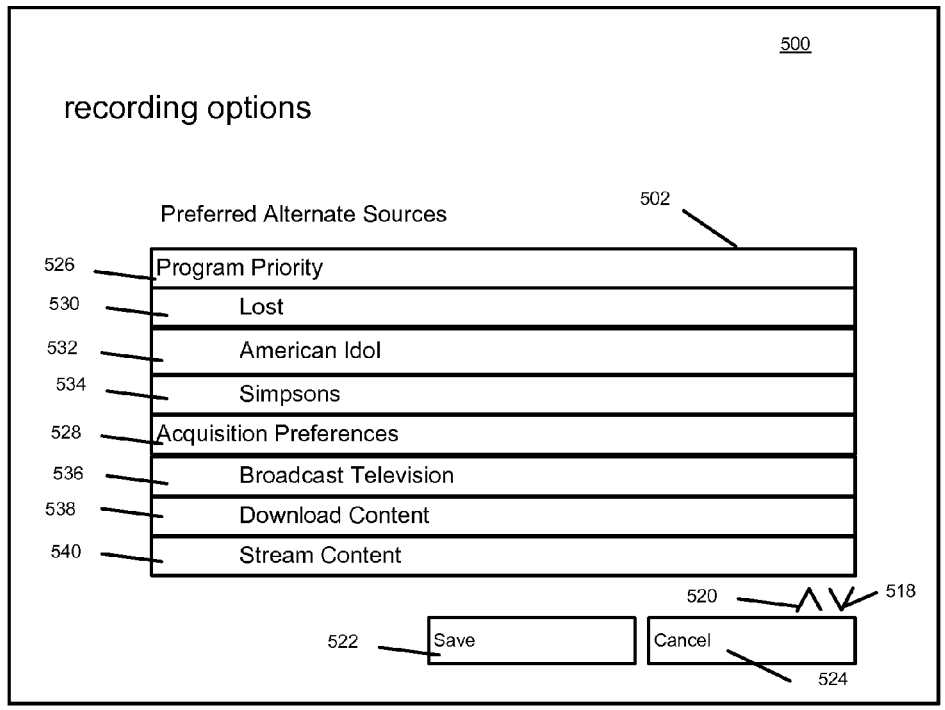
FIG. 10 illustrates yet another exemplary user interface for designating user preferences.

FIGS. 8-10 illustrate various embodiments of UIs that allow a user to set recording preferences or priorities (also referred to as "explicit settings"). FIG. 8 illustrates a UI that allows a user to rank the priority of certain alternate source. Here, UI 500 includes a settings interface 502. The interface 502 includes multiple attributes that a user can modify to set specific recording preferences. The interface 502 shown in FIG. 8 displays two attributes: Internet Sites—No Subscription Required 504 and Broadcast Stations—Subscription Required 506. Each attribute shown in FIG. 8 contains multiple values. However, the user is not required to add any values to the interface 502.

The Internet Sites attribute 504 allows a user to designate and/or rank websites as alternate sources for obtaining programs. FIG. 8 illustrates that the Internet Sites attribute 504 includes the following three values: ESPN 508, ABC.com 510 and NBC.com 512. In one embodiment, the user adds each value to the Internet Sites attribute 504. In another embodiment, the values 508-512 are preloaded into the Internet Sites attribute 504 in a predetermined order. If the values are preloaded, it may be preferable to preload the entire available catalog list of values. Regardless, the user may reorganize the values within each attribute by the drag-and-drop feature in the interface 502 (e.g., user clicks on NBC.com 512 and drags NBC.com 512 to the top of the values list within the Internet Sites attribute 504).

The values within each attribute are preferably weighted. For example, in FIG. 8, the values 508-512 are prioritized or weighted such that the system knows that ESPN 508 is one over ABC.com 510, which is one over NBC.com 512. Thus, when the system determines there is a conflict and locates a program on ESPN 508, ABC.com 510 and NBC.com 512, the system will rank obtaining the program from ESPN 508 higher than obtaining the program from either ABC.com or NBC.com.

The Broadcast Stations 506 allows a user to specify premium television channels that the user pays a fee for (e.g., HBO, Showtime, etc.). By adding these premium channels to the attribute 506, the system will include these premium channels in any program search. FIG. 8 illustrates that the Broadcast Stations 506 includes two values: Showtime 514 and HBO 516. If the user does not add any values to the Broadcast Stations 506, the system will not search any premium channels because the system will assume that the user does not subscribe to any of the premium channels.

The user may scroll through more attributes by selecting either the down indicator 518 or the up indicator 520. The interface 502 may include any number of attributes. The user may save changes made to the interface 502 (e.g., adding a new value or rearranging the value order) by selecting the save button 522. The user may exit the UI 500 without saving any changes by selecting the cancel button 524.

FIG. 10 illustrates additional exemplary attributes and values in the UI 500 that a user may select to prioritize recording preferences. As discussed above, the user may access these additional attributes by, for example, using the down indicator 518. The additional attributes shown in FIG. 10 include Program Priority 526 and Acquisition Preferences 528. The Program Priority 526 includes three values: Lost 530, American Idol 532 and Simpsons 534. The values are preferably added by the user. In the FIG. 10 embodiment, the values are displayed in a drag-and-drop format similar to as described in FIG. 8. However, the values may also be displayed in the manner shown in FIG. 9 or any other graphical display. As shown in FIG. 10, the Program Priority 526 displays that Lost 530 is prioritized over American Idol 532, which is prioritized over Simpsons 534.

The Acquisition Preferences 528 displayed in the interface 502 includes three values: Broadcast Television 536, Download Content 538 and Stream Content 540. The order of the values shown in FIG. 10 indicates that the user prefers that a program is obtained first from a broadcast television channel 536. And if the program is not available from a broadcast channel, the user prefers to obtain a downloadable version 538 of the program before a link to a streaming version 540 of the program is obtained. The user can change the order of these values 536-540 by selecting any one of the values and dragging the value to another position (e.g., select Download Content 538 and drag the Download Content 538 above Broadcast Television 536 so that the system will prioritize Download Content 538 as the first option for obtaining content). Other values are available (e.g., look for another PVR) and may be preloaded into the attribute 528. The UI 500 includes a save button 522 to allow the user to save changes made to the attributes and a cancel button 524 to allow the user to exit the UI 500 without saving any changes. The user may scroll through the other attributes in the interface 502 by selecting the down arrow 518 or the up arrow 520.

FIG. 9 illustrates another embodiment of a UI that allows a user to prioritize recording preferences. FIG. 9 illustrates a UI 560 having an interface 562. The interface 562 displays the same two attributes as the UI 500 does in FIG. 8: Internet Sites—No Subscription Required 504 and Broadcast Stations—Subscription Required 506. The Internet Sites attribute 504 includes three values: ESPN 508', ABC.com 510' and NBC.com 512'. The Broadcast Stations 506 includes two values: Showtime 514' and HBO 516'.

The interface 562, however, does not have drag-and-drop features. Instead, the values within each attribute must be selected individually by the user. For example, in the Internet Sites attribute 504, ESPN 508' has an indicator 564, ABC-.com 510' has an indicator 566 and NBC.com 512' has an indicator 568. In one embodiment, the user may select one or more indicators if the user wants designate one or more values as a one value. For example, if the user would like the system to obtain content first from NBC.com, the user can select the indicator 568 under the Internet Sites attribute 504. The interface 562 will display which values have been selected. FIG. 9 illustrates that the indicator 568 for NBC.com has been selected (other graphics may be displayed).

FIG. 9 illustrates that Broadcast Stations 506 includes two values: Showtime 514' and HBO 516'. Showtime 514' has an indicator 570 and HBO 516' has an indicator 572. Similar to the values in the Internet Sites 504, the user must select one or more of the indicators 570-572 to identify that the system should search a particular premium channel. Otherwise, the system will not search any of the premium channels when searching for an alternate source to obtain content from. The UI 560 also includes a down indicator 518 and an up indicator 520 that the user can select to scroll through all the attributes in the interface 562. The UI 560 also includes a save button 522 that the user may select to save changes to the attributes and a cancel button 524 that the user may select to return to the previous screen.

Figure 11:
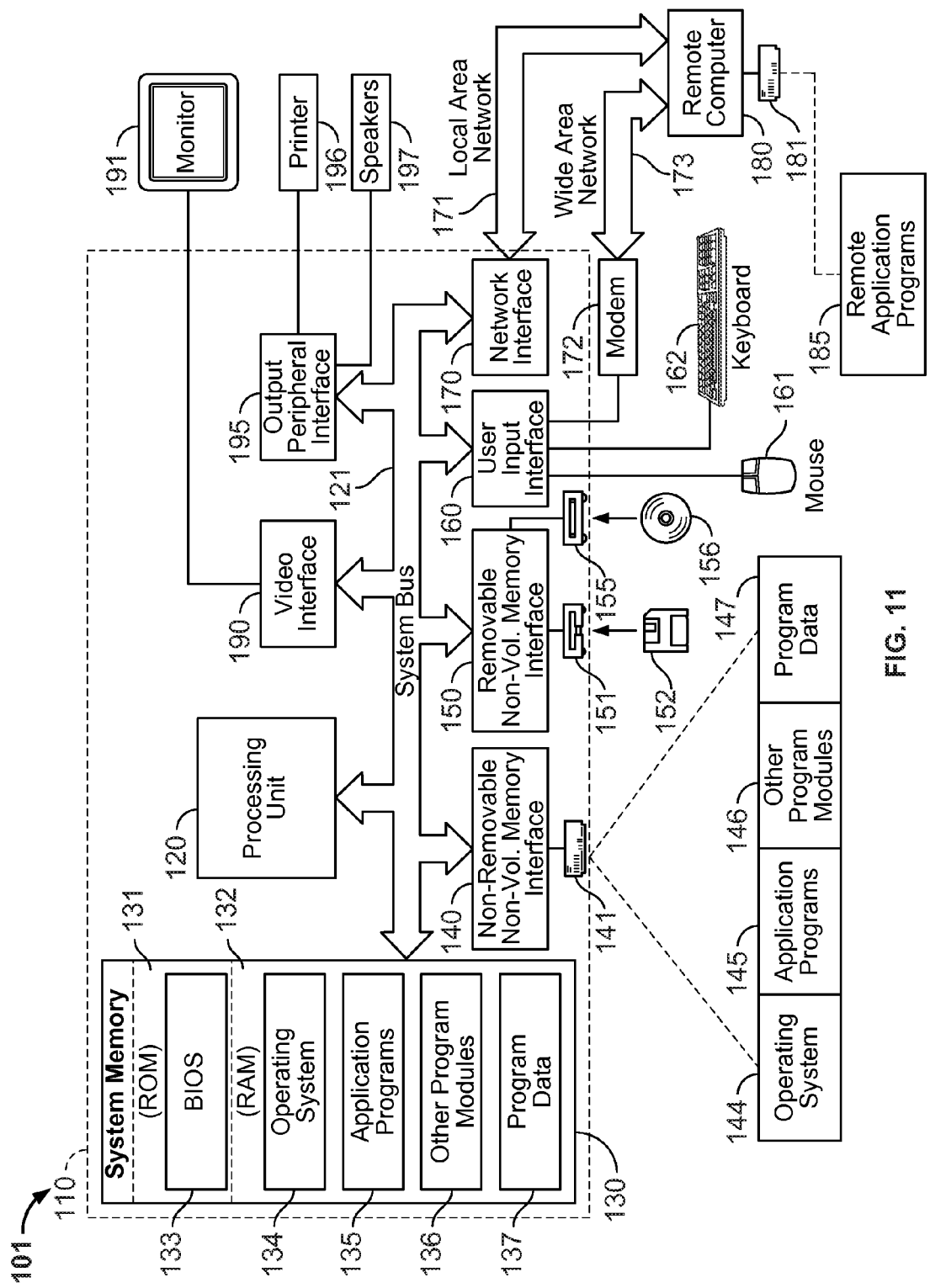
FIG. 11 depicts a block diagram of a computer system for performing the methods described herein.

FIG. 11 illustrates an example of a suitable general computing system environment 101 for resolving a recording conflict as described above. It is understood that the term "computer" as used herein broadly applies to any digital or computing device or system. The computing system environment 101 is only one example of a suitable computing environment and is not intended to suggest any limitation as to the scope of use or functionality of the inventive system. Neither should the computing system environment 101 be interpreted as having any dependency or requirement relating to any one or combination of components illustrated in the exemplary computing system environment 101.

With reference to FIG. 11, an exemplary system for implementing the inventive system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 may include a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as ROM 131 and RAM 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 11 illustrates operating system 134, application programs 135, other program modules 136, and program data 137.

The computer 110 may also include other removable/non-removable, volatile/nonvolatile computer storage media. By way of example only, FIG. 11 illustrates a hard disc drive 141 that reads from or writes to non-removable, nonvolatile magnetic media and a magnetic disc drive 151 that reads from or writes to a removable, nonvolatile magnetic disc 152. Computer 110 may further include an optical media reading device 155 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 141 is typically connected to the system bus 121 through a non-removable memory interface such as interface 140. Magnetic disc drive 151 and optical media reading device 155 are typically connected to the system bus 121 by a removable memory interface, such as interface 150.

The drives and their associated computer storage media discussed above and illustrated in FIG. 11, provide storage of computer readable instructions, data structures, program modules and other data for the computer 110. In FIG. 9, for example, hard disc drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 11. The logical connections depicted in FIG. 11 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communication over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 11 illustrates remote application programs 185 as residing on memory device 181. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method for acquiring scheduled broadcast content with coinciding program times using a digital recording device, comprising:
    (a) receiving a selection from a user of broadcast content to record from a user guide;
    (b) responsive to receiving the selection, determining that a conflict between two or more programs of scheduled broadcast content exists resulting in a conflict in acquiring the scheduled broadcast content;
    (c) identifying at least one broadcast television source and at least one or more alternate sources other than broadcast television that contain the scheduled broadcast content;
    (d) generating possible acquisition schedules for recording at least one instance of each of the two or more programs of the scheduled broadcast content, wherein the possible acquisition schedules each include recording one program from at least one alternate source identified in step (c), wherein generating possible acquisition schedules in step (d) is based in part on recording preferences set by the user that includes: a cost attribute; a quality attribute; and a source attribute; wherein generating possible acquisition schedules in step (d) comprises: combining the at least one or more alternate sources identified in step (c) into multiple possible acquisition schedules, wherein each possible acquisition schedule contains a different combination of the one or more alternate sources; and ranking the possible acquisition schedules;
    (e) displaying the possible acquisition schedules to the user in an order the possible acquisition schedules are ranked;
    (f) querying the user to choose one of the possible acquisition schedules displayed;
    (g) if the user selects one of the possible acquisition schedules displayed in step (e), setting a recording schedule of the digital recording device to the potential acquisition schedule selected by the user;
    (h) if the user does not select one of the possible acquisition schedules displayed in step (e), setting the recording schedule of the digital recording device to a highest ranked possible acquisition schedule; and
    (i) recording at least one program of scheduled broadcast content and obtaining at least one program of the scheduled broadcast content from an alternate source other than broadcast television based on one of the possible acquisition schedules generated in step (d).

2. The method as recited in claim 1, wherein the one or more alternate sources identified in step (c) comprise one of the following: a digital download, streaming media or a digital recorder.

3. The method as recited in claim 1, wherein determining that a conflict exists in step (b) comprises:
    determining whether the program times of the scheduled broadcast content overlap in time; and
    if the programs times of the scheduled broadcast content overlap in time, determining whether each of the scheduled broadcast content may be acquired at the scheduled program time.

4. The method as recited in claim 1, wherein generating possible acquisition schedules in step (d) is based in part on prior actions of a user.

5. The method as recited in claim 1, wherein the recording preferences set by a user may include one of the following:
    when the scheduled broadcast content is available;
    whether the scheduled broadcast content is a new airing; and
    whether the scheduled broadcast content is a live airing.

6. In a digital recorder for recording television programs, a method for acquiring broadcast content by resolving a conflict in recording a first television program having a broadcast time that overlaps with the broadcast time of another television program, comprising:
    (a) receiving user input defining a selection to record at least the first television program and a second television program;

(b) responsive to the receiving user input, determining that a conflict between one of at least the first television program or the second television program exists with a third television program, resulting in a conflict in acquiring the scheduled broadcast content of the first or second television program;

(c) identifying at least one alternate source that contains the first television program, wherein each alternate source containing the first television program is a source other than a broadcasting channel;

(d) identifying at least one alternate source that contains the second television program, wherein each alternate source containing the second television program is a source other than a broadcasting channel;

(e) generating multiple acquisition schedules, wherein each of the multiple acquisition schedules proposes to record each of the first, second and third television programs, at least one program being acquired from an alternate source other than a broadcasting channel, wherein generating multiple acquisition schedules in step (e) is based in part on recording preferences set by a user that include: a quality attribute; a cost attribute; and a source attribute; wherein generating multiple acquisition schedules in step (e) comprises: combining the one or more alternate sources identified in step (c) into multiple proposed acquisition schedules, wherein each proposed acquisition schedule contains a different combination of the one or more alternate sources; and ranking the multiple proposed acquisition schedules;

(f) presenting the multiple acquisition schedules to a user in an order ranked in step (e);

(g) querying the user to choose one of the presented proposed acquisition schedules;

(h) if the user selects one of the proposed acquisition schedules presented in step (f), setting a recording schedule of the digital recorder to the proposed acquisition schedules selected by the user;

(i) if the user does not select one of the proposed acquisition schedules presented in step (f), setting the recording schedule of the digital recorder to the highest ranked proposed acquisition schedule; and (j) recording at least one first the first, second, or third program as scheduled broadcast content and obtaining at least one of the first, second or third program from an alternate source other than broadcast television based on one of the possible acquisition schedules generated in step (e).

7. The method as recited in claim 6, wherein the first or second alternate source identified in step (d) comprises one of: streaming media, a digital download and a networked digital recorder.

8. The method as recited in claim 7, wherein identifying at least one alternate source in step (d) comprises:
contacting a second digital recorder and determining whether the second digital recorder can acquire the second television program.

9. The method as recited in claim 6, wherein ranking the multiple acquisition schedules in step (e) comprises:
(i) identifying the user selected recording preferences;
(ii) comparing each acquisition schedule generated in step (e) to the user selected recording preferences identified in step (e)(i);
(iii) ranking the acquisition schedules generated in step (e) based in part on the comparison in step (ii), wherein the highest ranked acquisition schedule comprises the acquisition schedule that satisfies the highest number of user selected recording preferences identified in step (e)(i).

10. The method as recited in claim 6, wherein ranking the multiple acquisition schedules in step (e) comprises:
(i) identifying the user recording preferences, wherein the user recording preferences are implied based on actions previously conducted by the user;
(ii) comparing each acquisition schedule generated in step (e) to the user recording preferences identified in step (e)(i);
(iii) ranking the acquisition schedules generated in step (e) based in part on the comparison in step (ii), wherein the highest ranked acquisition schedule comprises the acquisition schedule that best satisfies the user recording preferences identified in step (e)(i).

11. The method as recited in claim 6, further comprising:
(k) receiving a selected acquisition schedule from the user; and
(l) setting the acquisition schedule of the digital recorder to the acquisition schedule selected by the user.

12. The method as recited in claim 6, further comprising:
(m) recording the first and second television programs according to input provided by the user in response to the acquisition schedules presented in step (f).

13. A method of acquiring television programs from an alternate source when a digital recorder cannot record each of the television programs scheduled to be recorded by a viewer at the program's regularly scheduled broadcast time, comprising:
receiving the viewer selection of two or more programs of scheduled broadcast content, and responsive to the viewer selection, performing the sequential steps of:
(a) determining that a scheduling conflict between two or more programs of scheduled broadcast content exists resulting in a conflict in acquiring the scheduled broadcast content;
(b) identifying at least one alternate non-television source for at least one of the television programs scheduled to be recorded by the digital recorder;
(c) generating potential acquisition schedules, wherein each acquisition schedule for recording at least one instance of each of the two or more programs of the scheduled broadcast content, wherein the possible acquisition schedules each includes recording one program from at least one alternate source identified in step (b), wherein generating possible acquisition schedules in step (c) is based in part on recording preferences set by the viewer that includes: a quality attribute; a cost attribute; and a source attribute; wherein generating possible acquisition schedules in step (c) comprises: combining the at least one alternate sources identified in step (c) into multiple possible acquisition schedules, wherein each possible acquisition schedule contains a different combination of at least one alternate sources; and ranking the possible acquisition schedules;
(d) identifying the recording preferences set by the viewer;
(e) wherein the ranking potential acquisition schedules generated in step (c) based on the recording preferences identified in step (d);
(f) displaying the potential acquisition schedules to the viewer in an order ranked in step (e);
(g) if the viewer selects one of the potential acquisition schedules displayed in step (e), setting a recording schedule of the digital recorder to the potential acquisition schedules selected by the viewer;

(h) if the viewer does not select one of the potential acquisition schedules displayed in step (e), setting a recording schedule of the digital recorder to the highest ranked potential acquisition schedule; and (i) recording at least one program of scheduled broadcast content and obtaining at least one program of the scheduled broadcast content from an alternate source other than broadcast television based on one of the possible acquisition schedules generated in step (c).

14. The method as recited in 13, wherein identifying at least one non-television alternate source in step (b) comprises:

contacting a second digital recorder and determining whether the second digital recorder can acquire the television programs.

15. The method as recited in claim 14, wherein the at least one alternate source comprises one of: streaming media, a digital download, a second digital recorder.

16. The method as recited in claim, 13, wherein setting the acquisition schedule of the recording device equal to the highest ranked acquisition schedule comprises:

if one of the potential acquisition schedules comprises an ideal acquisition schedule, setting the acquisition schedule of the digital recorder to the ideal schedule; and if an ideal acquisition schedule is not found, setting the acquisition schedule of the digital recorder to the highest ranked acquisition schedule.

\* \* \* \* \*